US009964950B2

(12) United States Patent
Takano

(10) Patent No.: US 9,964,950 B2
(45) Date of Patent: May 8, 2018

(54) DRIVING ASSISTANCE APPARATUS AND DRIVING ASSISTANCE METHOD

(71) Applicant: TOYOTA JIDOSHA KABUSHIKI KAISHA, Toyota-shi, Aichi-ken (JP)

(72) Inventor: Masaki Takano, Susono (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 0 days. days.

(21) Appl. No.: 14/819,941

(22) Filed: Aug. 6, 2015

(65) Prior Publication Data
US 2016/0041554 A1 Feb. 11, 2016

(30) Foreign Application Priority Data

Aug. 11, 2014 (JP) .................. 2014-163624

(51) Int. Cl.
G01C 22/00 (2006.01)
G05D 1/00 (2006.01)
(Continued)

(52) U.S. Cl.
CPC ........... *G05D 1/0088* (2013.01); *B60K 35/00* (2013.01); *B60K 37/06* (2013.01); *B60W 10/18* (2013.01);
(Continued)

(58) Field of Classification Search
CPC ......... B60W 2550/00; B60W 2550/14; B60W 2550/22; B60W 2550/402; B60W 2710/18; B60W 2710/20; B60W 30/143; B60W 40/076; B60W 40/1005; B60W 50/0097; B60W 10/04; B60W 10/06; B60W 10/20; B60W 2040/082; G01C 21/26;
(Continued)

(56) References Cited

U.S. PATENT DOCUMENTS 9,304,513 B2 * 4/2016 Ichikawa .............. B60W 50/10
2004/0186663 A1 9/2004 Irie
(Continued)

FOREIGN PATENT DOCUMENTS

CN 102037327 A 4/2011
CN 102939230 A 2/2013
(Continued)

*Primary Examiner* — Anne M Antonucci
*Assistant Examiner* — Kenny A. Taveras
(74) *Attorney, Agent, or Firm* — Sughrue Mion, PLLC

(57) ABSTRACT

A driving assistance apparatus includes: a determination unit configured to determine, when a first junction and a second junction located ahead of the first junction exist on a travel road in an advancement direction of a vehicle, whether or not the first junction and the second junction satisfy a concurrent destination presentation condition on the basis of a distance between the first junction and the second junction; a presentation unit configured to present, when the first junction and the second junction are determined to satisfy the concurrent destination presentation condition, destination information ahead of the first junction and destination information ahead of the second junction to a driver of the vehicle; and a driving assistance unit configured to provide driving assistance to the vehicle in accordance with a destination selected by the driver on the basis of the presented destination information.

2 Claims, 3 Drawing Sheets

(51) Int. Cl.
*G05D 1/02* (2006.01)
*B60W 10/20* (2006.01)
*B60W 10/18* (2012.01)
*B60W 30/18* (2012.01)
*B60K 35/00* (2006.01)
*B60K 37/06* (2006.01)
*G01C 21/36* (2006.01)

(52) U.S. Cl.
CPC ............ *B60W 10/20* (2013.01); *B60W 30/18* (2013.01); *G01C 21/3626* (2013.01); *G05D 1/0223* (2013.01); *B60K 2350/1056* (2013.01); *B60K 2350/352* (2013.01); *B60W 2540/00* (2013.01); *B60W 2710/18* (2013.01); *B60W 2710/20* (2013.01); *G01C 21/3655* (2013.01)

(58) Field of Classification Search
CPC ............ G01C 21/3632; G01C 21/3638; G01C 21/3415; G01C 21/34; G01C 21/3626; G01C 21/3647; G01C 21/3664; G01C 21/3667; G01C 21/3697; G01C 21/28; G01C 21/3602; G01C 21/3629; G01C 21/3635; B60K 28/06; B60K 2031/005; B60K 2350/1056; B60K 2350/352; B60K 28/066; B60K 35/00; B60K 37/06
See application file for complete search history.

(56) References Cited

U.S. PATENT DOCUMENTS

| | | | | |
|---|---|---|---|---|
| 2006/0210114 | A1* | 9/2006 | Oka | B60R 1/00 382/104 |
| 2007/0106470 | A1* | 5/2007 | Nakayama | G01C 21/3629 701/437 |
| 2011/0069087 | A1* | 3/2011 | Cuprjak | G01C 21/36 345/672 |
| 2013/0110343 | A1 | 5/2013 | Ichikawa et al. | |
| 2013/0253815 | A1* | 9/2013 | Orfila | G08G 1/166 701/301 |
| 2014/0088815 | A1* | 3/2014 | Kitagishi | B60W 50/0098 701/29.1 |
| 2014/0340212 | A1* | 11/2014 | Ueda | B60K 37/02 340/441 |
| 2015/0302259 | A1* | 10/2015 | Oshida | B60R 1/00 382/103 |
| 2015/0307130 | A1* | 10/2015 | Kimura | B60W 30/10 701/41 |
| 2015/0321665 | A1* | 11/2015 | Pandita | G01C 21/28 701/409 |
| 2015/0345964 | A1* | 12/2015 | Oooka | G01C 21/3415 701/41 |
| 2016/0010998 | A1* | 1/2016 | Chia | G01C 21/26 701/461 |
| 2016/0018228 | A1* | 1/2016 | Parker | G01C 21/3623 701/412 |
| 2016/0041554 | A1* | 2/2016 | Takano | G05D 1/0088 701/25 |
| 2016/0046290 | A1* | 2/2016 | Aharony | G06K 9/00798 701/41 |
| 2016/0152184 | A1* | 6/2016 | Ogawa | G02B 27/0101 345/589 |
| 2016/0318490 | A1* | 11/2016 | Ben Shalom | B60T 7/12 |

FOREIGN PATENT DOCUMENTS

| | | |
|---|---|---|
| DE | 102011119752 A1 | 8/2012 |
| JP | 200039330 A | 2/2000 |
| JP | 2002122435 A | 4/2002 |
| JP | 2004286559 A | 10/2004 |
| JP | 2007-122155 A | 5/2007 |
| JP | 201133543 A | 2/2011 |
| JP | 2011-170844 A | 9/2011 |
| JP | 2012216069 A | 11/2012 |
| WO | 9611382 A1 | 4/1996 |
| WO | 2011/158347 A1 | 12/2011 |

\* cited by examiner

DRIVING ASSISTANCE APPARATUS AND DRIVING ASSISTANCE METHOD

INCORPORATION BY REFERENCE

The disclosure of Japanese Patent Application No. 2014-163624, filed on Aug. 11, 2014 including the specification, drawings and abstract, is incorporated herein by reference in its entirety.

BACKGROUND OF THE INVENTION

1. Field of the Invention

The invention relates to a driving assistance apparatus and a driving assistance method used to assist driving of a vehicle.

2. Description of Related Art

An apparatus described in Japanese Patent Application Publication No. 2007-122155 (JP 2007-122155 A), which detects a gaze of a driver in a direction of a branch road before reaching the branch road and estimates that a vehicle will proceed onto the branch road on the basis of a detection result including a gaze frequency and a cumulative gaze duration serving, is available as a conventional apparatus for assisting driving of a vehicle. After estimating that the vehicle will proceed onto the branch road, the apparatus notifies the driver that a speed of the vehicle is to be controlled to a suitable speed for the branch road, and when a refusal is not received from the driver in response, the apparatus controls the speed of the vehicle to a suitable speed for the branch road.

However, when a plurality of consecutive junctions occur within a short distance on the travel road, for example, destinations ahead of the junctions must be selected in a short amount of time, making it difficult for the driver to select the destination of the vehicle smoothly. When the apparatus described above is employed in this case, it may be impossible to estimate precisely that the vehicle will proceed onto the branch road and control the speed of the vehicle appropriately to a suitable speed for the branch road.

SUMMARY OF THE INVENTION

The invention therefore provides a driving assistance apparatus and a driving assistance method with which a driver can select destinations ahead of junctions smoothly even when a plurality of junctions occur consecutively, whereupon driving assistance can be provided appropriately.

A first aspect of the invention relates to a driving assistance apparatus that provides driving assistance to cause a vehicle to travel along a travel road. The driving assistance apparatus includes: a determination unit configured to determine, when a first junction and a second junction located ahead of the first junction exist on the travel road in an advancement direction of the vehicle, whether or not the first junction and the second junction satisfy a concurrent destination presentation condition on the basis of a distance on the travel road between the first junction and the second junction; a presentation unit configured to present, when the first junction and the second junction are determined to satisfy the concurrent destination presentation condition, destination information ahead of the first junction and destination information ahead of the second junction to a driver of the vehicle; and a driving assistance unit configured to provide driving assistance to the vehicle in accordance with a destination selected by the driver on the basis of the destination information presented by the presentation unit.

According to this configuration, when driving assistance is provided to cause the vehicle to travel along the travel road and a plurality of junctions exist on the travel road such that the junctions satisfy the concurrent destination presentation condition, the destination information ahead of the plurality of junctions is presented to the driver so that the driver can select the destinations of the vehicle. The destinations of the plurality of junctions can therefore be set by a single destination selection operation. Hence, even when a plurality of junctions exist consecutively, the driver can select the destinations ahead of the junctions smoothly, and as a result, appropriate driving assistance can be provided.

The determination unit may be configured to determine that the concurrent destination presentation condition is satisfied when the distance on the travel road between the first junction and the second junction is equal to or shorter than a preset determination threshold.

In this case, the concurrent destination presentation condition is determined to be satisfied when a plurality of junctions exist on the travel road and the distance between the junctions is equal to or shorter than the distance determination threshold, whereupon the destination information ahead of the plurality of junctions is presented to the driver so that the driver can select the destinations of the vehicle. The destinations of the plurality of junctions can therefore be set by a single destination selection operation. Hence, even when a plurality of junctions exist consecutively within a short distance, the driver can select the destinations ahead of the junctions smoothly, and as a result, appropriate driving assistance can be provided.

The determination unit may be configured to set the determination threshold to be higher as a vehicle speed of the vehicle increases.

In this case, the concurrent destination presentation condition is set by setting the determination threshold to be steadily higher as the vehicle speed of the vehicle increases. Accordingly, the concurrent destination presentation condition becomes steadily more likely to be satisfied as the vehicle speed increases, and therefore sufficient time for the driver to select destinations can be secured even when the vehicle speed is high.

The determination unit may be configured to set the determination threshold to be higher when a possibility of a lane change by the vehicle between the first junction and the second junction exists than when the possibility of the lane change does not exist.

In this case, the concurrent destination presentation condition is set by setting the determination threshold to be higher when the possibility of a lane change by the vehicle exists than when the possibility of a lane change by the vehicle does not exist. Accordingly, the concurrent destination presentation condition is more likely to be satisfied when the possibility of a lane change exists, and therefore sufficient time for the driver to select destinations can be secured even when the possibility of a lane change by the vehicle exists.

The determination unit may be configured to set the determination threshold to be higher when a curve having one of a curvature equal to or larger than a predetermined curvature and a radius of curvature equal to or smaller than a predetermined radius of curvature exists within a predetermined region ahead of the second junction than when the curve does not exist.

In this case, the concurrent destination presentation condition is set by setting the determination threshold to be higher when a curve exists after the second junction than when a curve does not exist. Accordingly, the concurrent destination presentation condition is more likely to be satisfied when a curve exists ahead of the second junction, and therefore the destination can be set early even when a curve exists ahead of the second junction, whereupon the vehicle can be caused to travel in preparation for the curve.

The presentation unit may be configured to present, when the first junction and the second junction are determined not to satisfy the concurrent destination presentation condition, only the destination information ahead of the first junction to the driver of the vehicle.

A second aspect of the invention relates to a driving assistance method for providing driving assistance to cause a vehicle to travel along a travel road. The driving assistance method includes: determining, when a first junction and a second junction located ahead of the first junction exist on the travel road in an advancement direction of the vehicle, whether or not the first junction and the second junction satisfy a concurrent destination presentation condition on the basis of a distance on the travel road between the first junction and the second junction; presenting, when the first junction and the second junction are determined to satisfy the concurrent destination presentation condition, destination information ahead of the first junction and destination information ahead of the second junction to a driver of the vehicle; and providing driving assistance to the vehicle in accordance with a destination selected by the driver on the basis of the presented destination information.

According to this configuration as well, even when a plurality of junctions exist consecutively, the driver can select the destinations ahead of the junctions smoothly, and as a result, appropriate driving assistance can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the invention will be described below with reference to the drawings. Note that in the following description, identical reference symbols have been allocated to identical or corresponding elements, and duplicate description thereof has been omitted.

Figure 1:
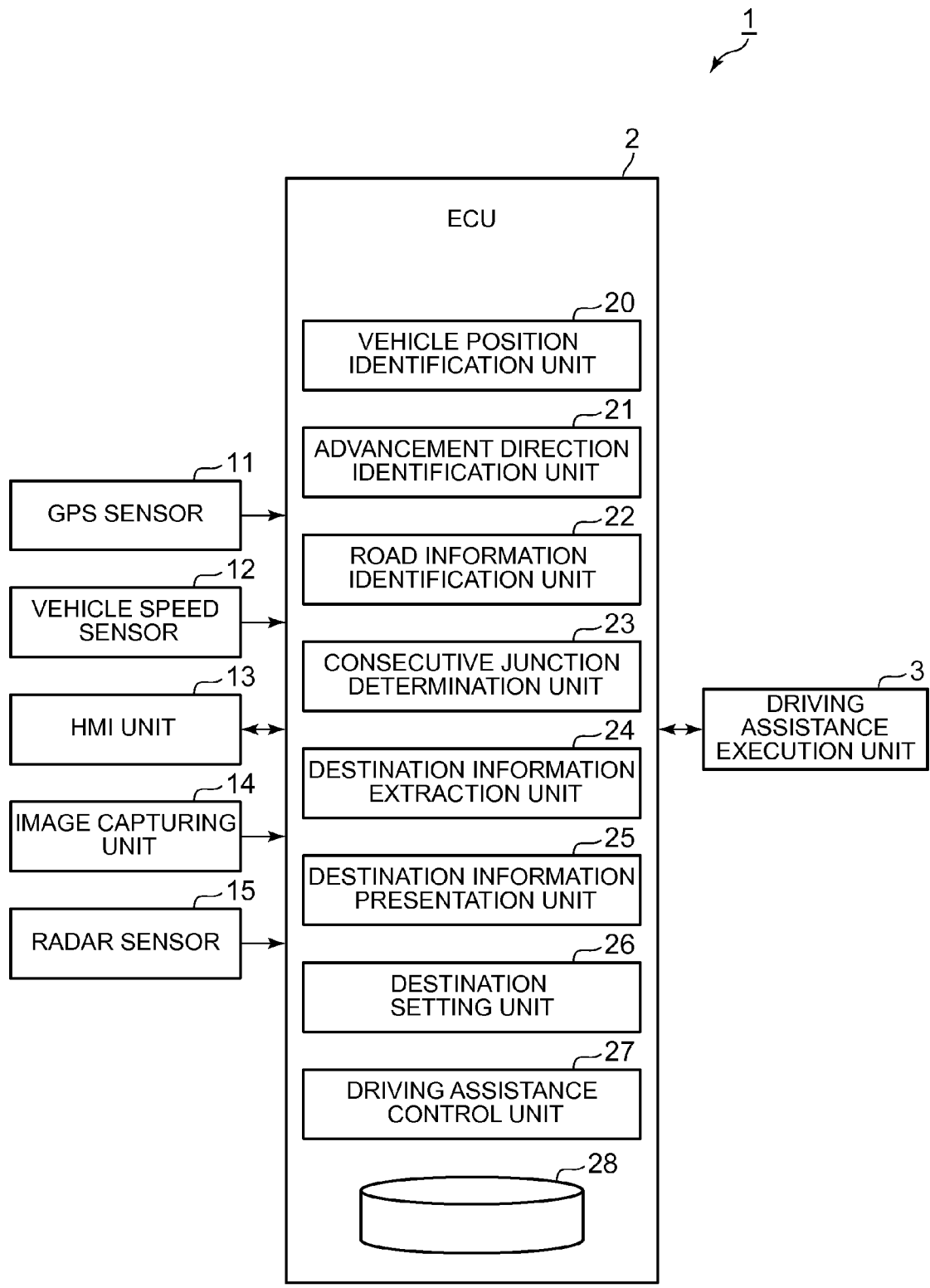
FIG. 1 is a schematic block diagram showing a configuration of a driving assistance apparatus according to an embodiment of the invention.

FIG. 1 is a schematic view showing a configuration of a driving assistance apparatus 1 according to this embodiment of the invention. In FIG. 1, the driving assistance apparatus 1 according to this embodiment is installed in a vehicle in order to provide driving assistance to cause the vehicle to travel along a travel road. More specifically, when a junction appears on the travel road in an advancement direction of the vehicle, the driving assistance apparatus 1 prompts a driver of the vehicle to select a destination ahead of the junction, and then implements driving assistance control corresponding to the selected destination. The vehicle is a vehicle that is capable of autonomous travel, for example, which can travel along the travel road in response to steering assist control such as lane trace control and driving/braking assist control such as autocruise control. A control apparatus for implementing the steering assist control and driving/braking assist control may be provided in the driving assistance apparatus 1 or provided as a separate control apparatus to the driving assistance apparatus 1. Here, a case in which the control apparatus is provided in the driving assistance apparatus 1 will be described. Note that the steering assist control and the driving/braking assist control implemented on the vehicle are not limited respectively to lane trace control and autocruise control, and other types of control may be used instead.

The driving assistance apparatus 1 includes an electronic control unit (ECU) 2, a driving assistance execution unit 3, a global positioning system (GPS) sensor 11, a vehicle speed sensor 12, a human machine interface (HMI) unit 13, an image capturing unit 14, and a radar sensor 15.

The driving assistance execution unit 3 functions as a part of a driving assistance unit that provides driving assistance to cause the vehicle to travel along the travel road. At a junction, the driving assistance execution unit 3 provides driving assistance to cause the vehicle to travel in accordance with the destination selected by the driver of the vehicle. The driving assistance execution unit 3 is electrically connected to the ECU 2 and activated upon reception of a driving assistance control signal from the ECU 2. A drive control ECU that implements drive control on the vehicle, a brake control ECU that implements brake control on the vehicle, a steering control ECU that implements steering control on the vehicle, and so on, for example, are used as the driving assistance execution unit 3.

The GPS sensor 11 obtains information indicating a position of the vehicle by receiving a signal from a GPS satellite. The GPS sensor 11 is electrically connected to the ECU 2, and outputs a reception signal to the ECU 2. Note that another sensor or device capable of obtaining information indicating the position of the vehicle may be used instead of the GPS sensor 11.

The vehicle speed sensor 12 is a vehicle speed detector that detects a travel speed of the vehicle. A vehicle wheel speed sensor, for example, is used as the vehicle speed sensor 12. The vehicle speed sensor 12 is electrically connected to the ECU 2, and outputs a vehicle speed signal to the ECU 2.

The HMI unit 13 is an interface used by a passenger, including the driver. The HMI unit 13 receives input from the passenger in relation to the driving assistance apparatus 1, and provides output from the driving assistance apparatus 1 to the passenger. A switch, a touch panel, a microphone, a monitor, a speaker, or the like, for example, is used as the HMI unit 13. The HMI unit 13 is electrically connected to the ECU 2 in order to input and output signals to and from the ECU 2.

The image capturing unit 14 is an image capturing apparatus that captures images of a periphery of the vehicle. A camera, for example, is used as the image capturing unit 14. The image capturing unit 14 is electrically connected to the ECU 2, and outputs an image-capture signal to the ECU 2. The image-capture signal is used in processing executed during the lane trace control to identify a white line on the travel road, for example. The image-capture signal may also be used in processing for identifying a preceding vehicle.

The radar sensor 15 is an object detection sensor that detects objects on the periphery of the vehicle. A millimeter wave radar, for example, is used as the radar sensor 15. The radar sensor 15 is electrically connected to the ECU 2, and outputs a detection signal to the ECU 2. The detection signal is used in processing executed during the autocruise control to identify a preceding vehicle, for example. The detection signal from the radar sensor 15 may also be used in processing for detecting an obstruction on a side of the vehicle, for example another vehicle. Note that a sensor other than a millimeter wave radar, for example a radar sensor that uses ultrasonic waves or laser, or any other device capable of obtaining information indicating peripheral objects, may be used as the object detection sensor that detects objects on the periphery of the vehicle.

The ECU 2 executes assistance control in the driving assistance apparatus 1, and is constituted mainly by a computer having a central processing unit (CPU), a read only memory (ROM), and a random access memory (RAM), for example. The ECU 2 includes a vehicle position identification unit 20, an advancement direction identification unit 21, a road information identification unit 22, a consecutive junction determination unit 23, a destination information extraction unit 24, a destination information presentation unit 25, a destination setting unit 26, a driving assistance control unit 27, and a database 28. The vehicle position identification unit 20, advancement direction identification unit 21, road information identification unit 22, consecutive junction determination unit 23, destination information extraction unit 24, destination information presentation unit 25, destination setting unit 26, and driving assistance control unit 27 are realized by installing a program or software having these functions in the computer, for example. Alternatively, all or a part of the vehicle position identification unit 20, advancement direction identification unit 21, road information identification unit 22, consecutive junction determination unit 23, destination information extraction unit 24, destination information presentation unit 25, destination setting unit 26, and driving assistance control unit 27 may be constituted by individual controllers. The database 28 functions as a recording unit on which data relating to driving assistance are recorded, and mainly stores map data.

The vehicle position identification unit 20 identifies the vehicle position. For example, vehicle position data are obtained on the basis of the reception signal from the GPS sensor 11, whereupon the vehicle position on a travel road is identified on the map data in the database 28.

The advancement direction identification unit 21 identifies the advancement direction of the vehicle. The advancement direction identification unit 21 identifies the advancement direction of the vehicle on the basis of temporal variation in the position of the vehicle, for example. The road information identification unit 22 identifies road information on the periphery of the vehicle. For example, the road information identification unit 22 identifies a junction on the travel road in the advancement direction of the vehicle on the basis of the map data in the database 28. A junction existing on the travel road in the advancement direction of the vehicle may be a junction existing on a travel road that branches off from the nearest junction. The road information identification unit 22 also identifies road shapes such as curves on the travel road in the advancement direction of the vehicle. A junction is a point where the travel road branches in a plurality of directions, and includes a point where the travel road branches in two directions, an intersection where the travel road branches in three directions, and so on.

The consecutive junction determination unit 23 determines whether or not a plurality of junctions appear consecutively on the travel road in the advancement direction of the vehicle. For example, the consecutive junction determination unit 23 determines whether or not the nearest junction and a following junction exist on the travel road within a predetermined distance in the advancement direction of the vehicle. A distance between the junctions may be calculated on the basis of the map data in the database 28. Note that instead of determining whether or not the junctions appear consecutively, the consecutive junction determination unit 23 may determine only whether or not a concurrent destination presentation condition, to be described below, is satisfied.

After determining that a plurality of junctions appear consecutively on the travel road in the advancement direction of the vehicle, the consecutive junction determination unit 23 functions as a determination unit configured to determine whether or not the junctions satisfy the concurrent destination presentation condition on the basis of the distance between the plurality of junctions. For example, when a first junction constituting the nearest junction and a second junction constituting the following junction exist in the advancement direction of the vehicle, the consecutive junction determination unit 23 determines whether or not the first junction and the second junction satisfy the concurrent destination presentation condition on the basis of a distance on the travel road between the first junction and the second junction. The concurrent destination presentation condition is a condition to present destination information ahead of the first junction (information indicating destinations of travel roads branching off from the first junction) and destination information ahead of the second junction (information indicating destinations of travel roads branching off from the second junction) concurrently to the driver of the vehicle. When the first junction and the second junction satisfy the concurrent destination presentation condition, the destination information ahead of the first junction and the destination information ahead of the second junction are presented to the driver concurrently. When the first junction and the second junction do not satisfy the concurrent destination presentation condition, on the other hand, only the destination information ahead of the first junction is presented to the driver.

The concurrent destination presentation condition is satisfied when, for example, the distance on the travel road between the first junction and the second junction is equal to or shorter than a preset determination threshold. The determination threshold is a value set in advance as a distance threshold, for example. The determination threshold is set at a smaller value than a value of the predetermined distance used to determine the existence of consecutive junctions, as described above. When the distance on the travel road between the first junction and the second junction is equal to or shorter than the determination threshold, the concurrent destination presentation condition is determined to be satisfied, and accordingly, the destination information ahead of the first junction and the destination information ahead of the second junction are presented to the driver concurrently. When the distance on the travel road between the first junction and the second junction is not equal to or shorter than the determination threshold, on the other hand, only the destination information ahead of the first junction, i.e. the nearest junction, is presented to the driver.

The concurrent destination presentation condition may be set as a condition that is modified on the basis of the vehicle speed of the vehicle. In this case, by setting the concurrent destination presentation condition as a condition that is modified on the basis of the vehicle speed, a time required by the driver to select a destination can be adjusted in accordance with the vehicle speed, and as a result, more appropriate driving assistance can be provided. Moreover, the concurrent destination presentation condition may be set by setting the distance determination threshold to increase steadily as the vehicle speed increases. In this case, the concurrent destination presentation condition becomes steadily more likely to be satisfied as the vehicle speed increases, and therefore sufficient time for the driver to select a destination can be secured even when the vehicle speed is high. As a result, a load exerted on the driver during destination selection can be lightened. The vehicle speed may be the current travel speed of the vehicle or an average vehicle travel speed on the current travel road.

Furthermore, the concurrent destination presentation condition may be set as a condition that is modified on the basis of the possibility of a lane change by the vehicle before reaching the second junction. In this case, by setting the concurrent destination presentation condition as a condition that is modified on the basis of the possibility of a lane change by the vehicle before reaching the second junction, the time required by the driver to select a destination can be adjusted in accordance with the possibility of a lane change, and as a result, more appropriate driving assistance can be provided. The possibility of a lane change can be determined on the basis of a number of lanes on the travel road of the vehicle, for example. More specifically, when only one lane exists in a travel direction of the vehicle, the possibility of a lane change is determined to be non-existent, but when two or more lanes exist in the travel direction of the vehicle, a lane change is determined to be possible. In this case, the possibility of a lane change may be determined in consideration of the travel lane of the vehicle. Note that as long as the possibility of a lane change can be determined, the possibility of a lane change may be determined on the basis of a parameter other than the number of lanes.

Moreover, the determination as to whether or not the concurrent destination presentation condition is satisfied may be made by setting the determination threshold to be higher when the possibility of a lane change by the vehicle between the first junction and the second junction exists than when the possibility of a lane change does not exist. In this case, the concurrent destination presentation condition is set by setting the determination threshold to be higher when the possibility of a lane change by the vehicle exists than when the possibility of a lane change does not exist. Accordingly, the concurrent destination presentation condition is more likely to be satisfied when the possibility of a lane change exists, and therefore sufficient time for the driver to select a destination can be secured even when the possibility of a lane change by the vehicle exists. As a result, the driver of the vehicle can select a destination in good time even when a lane change is performed.

The concurrent destination presentation condition may also be set in accordance with the existence of a curve ahead of the second junction. In this case, by setting the concurrent destination presentation condition in accordance with the existence of a curve ahead of the second junction, it is possible to determine early that the vehicle is about to proceed onto the travel road including the curve, and therefore the vehicle can be caused to travel in preparation for the curve following the second junction in advance. Furthermore, the determination as to whether or not the concurrent destination presentation condition is satisfied may be made by setting the determination threshold to be higher when a curve having a curvature equal to or larger than a predetermined curvature exists in a predetermined region ahead of the second junction than when such a curve does not exist. In this case, the concurrent destination presentation condition is modified by setting the determination threshold to be higher when a curve exists ahead of the second junction than when a curve does not exist. Accordingly, the concurrent destination presentation condition is more likely to be satisfied when a curve exists ahead of the second junction, and therefore the destination can be set early even when a curve exists ahead of the second junction, whereupon the vehicle can be caused to travel in preparation for the curve. The predetermined region is a preset region, and the predetermined curvature is a preset curvature. The predetermined region and the predetermined curvature may be set in accordance with whether or not vehicle speed adjustment is required before passing through the second junction. Further, the existence of a curve may be determined on the basis of a radius of curvature of the curve instead of the curvature of the curve. For example, the determination as to whether or not the concurrent destination presentation condition is satisfied may be made by setting the determination threshold to be higher when a curve having a radius of curvature equal to or smaller than a predetermined radius of curvature exists in the predetermined region following the second junction than when such a curve does not exist. Moreover, the concurrent destination presentation condition may be set in accordance with all or a part of the vehicle speed, the possibility of a lane change, and the existence of a curve, as described above.

The concurrent destination presentation condition may also be set in accordance with the load exerted on the driver when selecting a destination ahead of a junction. For example, the distance between the first junction and the second junction, the vehicle speed of the vehicle, the possibility of a lane change, and the existence of a curve ahead of the second junction may be set as respective parameters, the load exerted on the driver may be calculated on the basis of these parameters, and the determination as to whether or not the destination information ahead of the first junction and the destination information ahead of the second junction is presented concurrently may be made on the basis of whether or not the calculated load equals or exceeds a preset load determination threshold. Note that the consecutive junction determination unit 23 may set the concurrent destination presentation condition by calculating the load exerted on the driver using a part of the respective parameters constituted by the distance between the first junction and the second junction, the vehicle speed of the vehicle, the possibility of a lane change, and the existence of a curve.

The destination information extraction unit 24 extracts destination ahead of the junction. The destination information extraction unit 24 extracts the information ahead of the junction from the map data in the database 28, for example. When the consecutive junction determination unit 23 determines that the first junction and the second junction exist within the distance determination threshold, the destination information ahead of the first junction and the destination information ahead of the second junction are extracted. When the consecutive junction determination unit 23 determines that the first junction and the second junction do not exist within the distance determination threshold, on the other hand, only the destination information ahead of the first junction is extracted. Place name data relating to localities positioned beyond the junctions are extracted as the destination information from place name data recorded in the database 28. The place name data may be any data indicating a destination direction of a travel road branching off from the junction, for example locality name data or landmark name data.

The destination information presentation unit 25 presents the destination information ahead of the junction to the driver. The destination information presentation unit 25 presents the destination information ahead of the junction to the driver via the HMI unit 13, for example. Further, when the first junction and the second junction are determined to satisfy the concurrent destination presentation condition, the destination information presentation unit 25 presents both the destination information ahead of the first junction and the destination information ahead of the second junction to the driver of the vehicle concurrently. When it is determined that the first junction and the second junction do not satisfy the concurrent destination presentation condition, on the other hand, the destination information presentation unit 25 presents only the destination information ahead of the first junction to the driver of the vehicle. In a specific presentation operation, presentation information such as place name data is output to the HMI unit 13 from the destination information presentation unit 25, whereupon the destination information is displayed on the monitor or output as voice output. The destination setting unit 26 sets a destination selected by the driver on the basis of the plurality of destination information presented by the HMI unit 13 as the destination of the vehicle.

The driving assistance control unit 27 functions as a part of the driving assistance unit configured to provide driving assistance to cause the vehicle to travel along the travel road. More specifically, the driving assistance control unit 27 executes driving assistance control to cause the vehicle to travel along the travel road, and when a junction appears on the travel road in the advancement direction of the vehicle, causes the vehicle to travel toward the destination selected by the driver. The driving assistance control unit 27 implements steering assist control such as lane trace control and driving/braking assist control such as autocruise control, for example, as the driving assistance control. More specifically, the driving assistance control unit 27 causes the driving assistance execution unit 3 to implement a driving assistance operation by outputting a control signal to the driving assistance execution unit 3.

Next, an operation implemented by the driving assistance apparatus according to this embodiment will be described.

Figure 2:
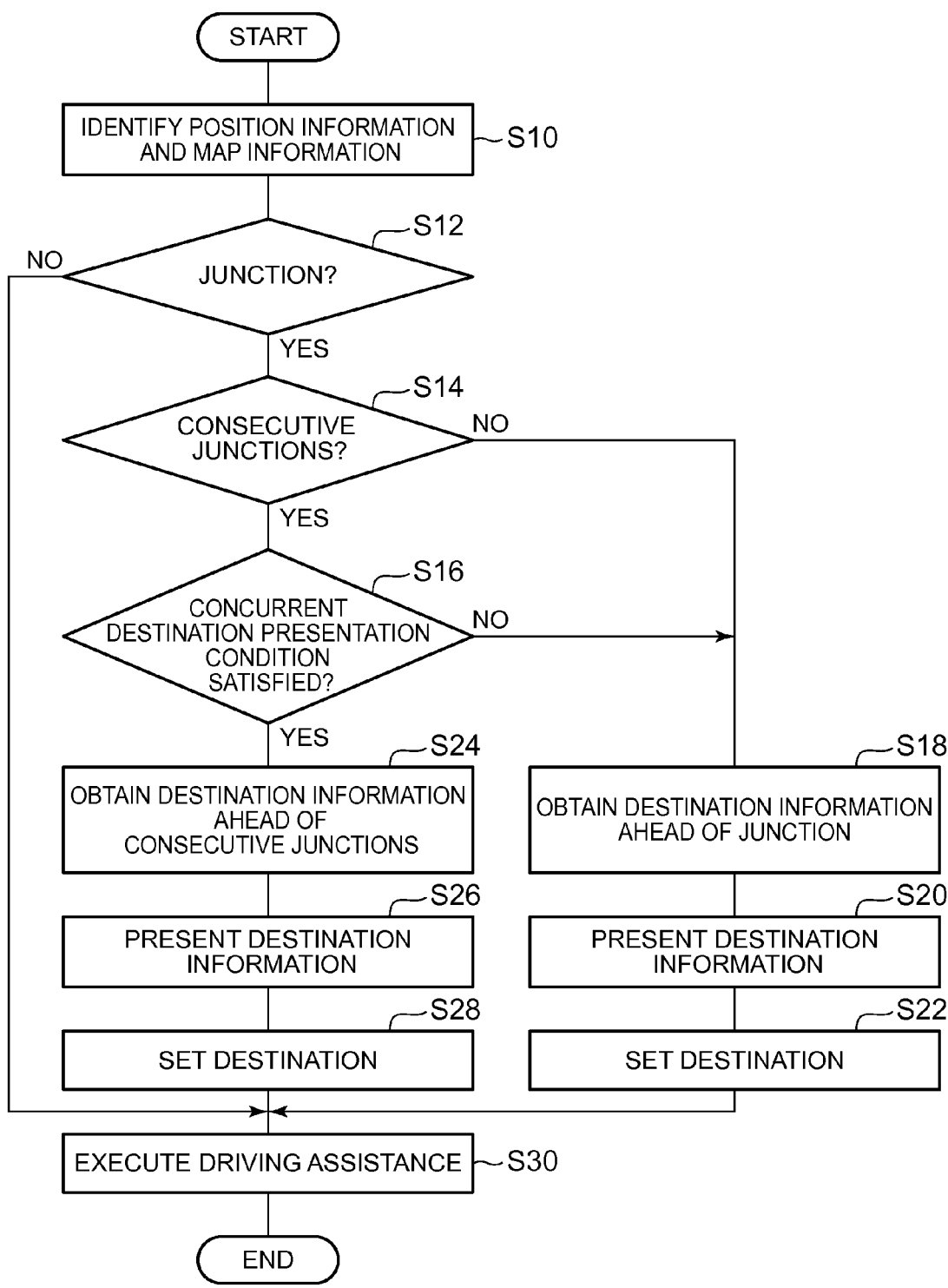
FIG. 2 is a flowchart showing driving assistance processing executed by the driving assistance apparatus of FIG. 1.
Figure 3:
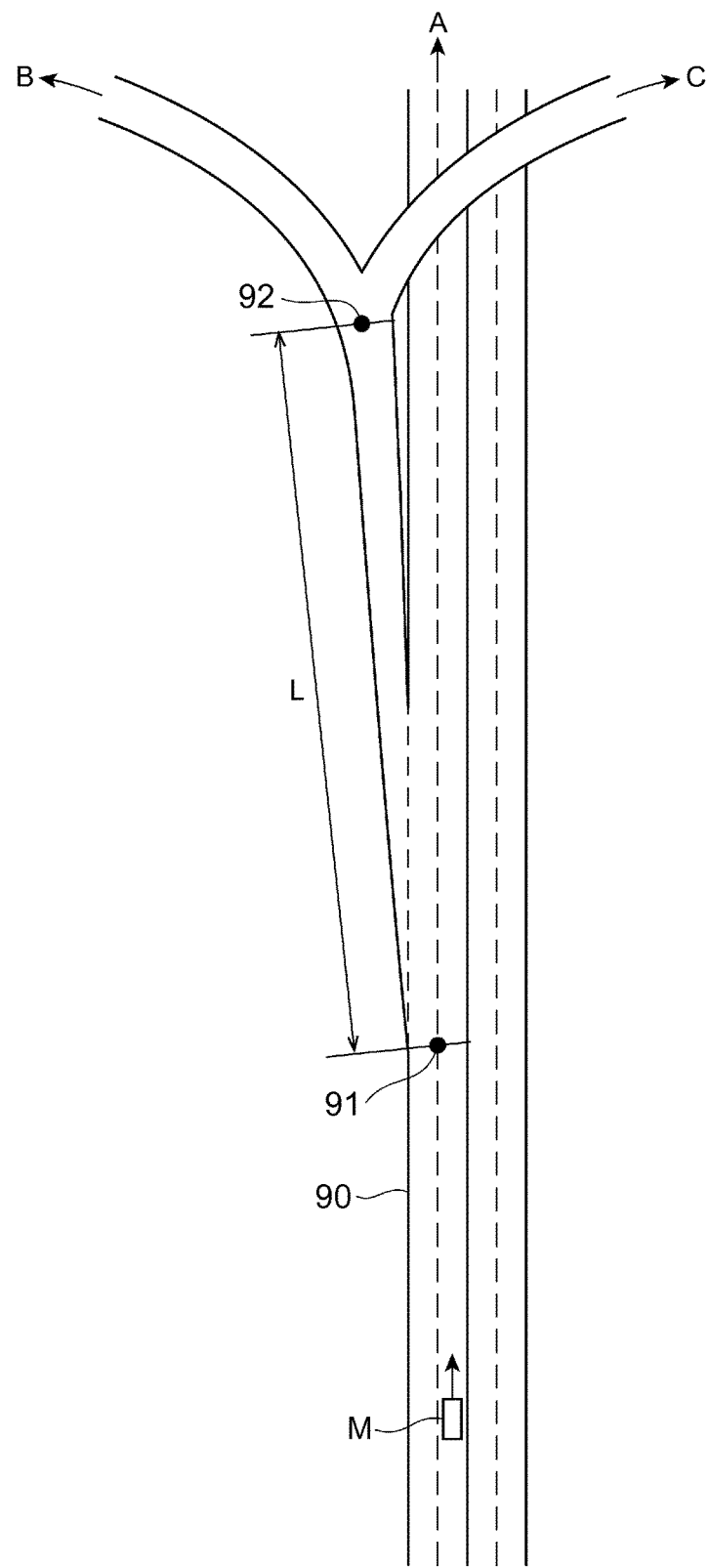
FIG. 3 is a view showing a travel road of a vehicle installed with the driving assistance apparatus of FIG. 1.

FIG. 2 is a flowchart showing driving assistance processing executed by the driving assistance apparatus 1 according to this embodiment. FIG. 3 is an illustrative view showing a junction on a travel road.

Here, driving assistance processing executed when a vehicle M installed with the driving assistance apparatus 1 travels autonomously along a travel road 90 without a set destination, as shown in FIG. 3, will be described.

First, as shown in step S10 (abbreviated to "S10" hereafter; this applies likewise to all subsequent steps) of FIG. 2, position information and map information identification processing is performed. This identification processing is processing for identifying position information relating to the vehicle M and map information relating to the periphery of the vehicle M, and is performed by the vehicle position identification unit 20, the advancement direction identification unit 21, and the road information identification unit 22, for example. More specifically, the position of the vehicle M on a map and on the travel road 90 is identified on the basis of reception information from the GPS sensor 11 and the map data in the database 28. Further, the advancement direction of the vehicle M is identified on the basis of temporal variation in the position of the vehicle M. Furthermore, a first junction 91 and a second junction 92 are identified on the travel road 90 in the advancement direction of the vehicle M.

Moreover, during the identification processing, a curve having one of a curvature equal to or larger than the predetermined curvature and a radius of curvature having equal to or smaller than the predetermined radius of curvature may be identified on the travel road 90 ahead of the respective junctions 91, 92. The possibility of a lane change by the vehicle M may also be identified in accordance with respective routes of the vehicle M ahead of the junctions 91, 92. In FIG. 3, for example, a lane change is not required for the vehicle M to advance straight through the first junction 91 and proceed in an A direction, but a lane change to an adjacent lane is required for the vehicle M to proceed in a B direction or a C direction after passing through the first junction 91. When the vehicle M is in this travel condition, therefore, the possibility of a lane change is determined to exist. When the vehicle M travels in an adjacent lane to the current travel lane in FIG. 3, on the other hand, a lane change is not required to proceed in any of the A direction, the B direction, and the C direction. In this case, therefore, the possibility of a lane change is determined to be non-existent. Further, since only one lane exists between the first junction 91 and the second junction 92, the possibility of a lane change is determined to be non-existent likewise in this case.

The processing then advances to S12, where a determination is made as to whether or not a junction exists on the travel road 90 in the advancement direction of the vehicle M. For example, a determination as to whether or not a junction exists within a predetermined distance in the advancement direction of the vehicle M is made on the basis of identification results obtained in the identification processing of S10. A preset distance value is used as the predetermined distance.

When it is determined in S12 that a junction does not exist on the travel road 90 in the advancement direction of the vehicle M, driving assistance execution processing is performed (S30). The driving assistance execution processing is processing for executing driving assistance to cause the vehicle M to travel along the travel road 90. When a junction does not exist on the travel road 90, steering assist control such as lane trace control and driving/braking assist control such as autocruise control, for example, are executed as vehicle travel control for causing the vehicle to travel along the travel road 90.

When it is determined in S12 that a junction exists on the travel road 90 in the advancement direction of the vehicle M, on the other hand, a determination is made as to whether or not consecutive junctions exist (S14). This determination processing is processing for determining whether or not the nearest junction to the vehicle M and the following junction exist consecutively, and is performed by the consecutive junction determination unit 23, for example. When, as shown in FIG. 3, the first junction 91 exists as the nearest junction to the vehicle M and the second junction 92 exists thereafter, a determination is made as to whether or not the first junction 91 and the second junction 92 exist within a predetermined distance. For example, a distance L on the travel road between the first junction 91 and the second junction 92 is calculated, and a determination is made as to whether or not the distance L between the first junction 91 and the second junction 92 is equal to or shorter than a preset distance value. Note that when the distance between the consecutive junctions is determined in S16, to be described below, the determination processing of S14 may be omitted.

When it is determined in S14 that the junctions exist consecutively, a determination is made on the basis of the distance on the travel road between the consecutive junctions as to whether or not the junctions satisfy the concurrent destination presentation condition (S16). When the first junction constituting the nearest junction and the second junction constituting the following junction exist in the advancement direction of the vehicle, for example, the determination as to whether or not the first junction and the second junction satisfy the concurrent destination presentation condition is made on the basis of the distance on the travel road between the first junction and the second junction. As described above, the concurrent destination presentation condition is a condition on which to present the destination information ahead of the first junction and the destination information ahead of the second junction to the driver of the vehicle concurrently. The concurrent destination presentation condition is satisfied when, for example, the distance on the travel road between the first junction and the second junction is equal to or shorter than the preset determination threshold. The determination threshold is a value set in advance as a distance threshold, for example. In this case, the concurrent destination presentation condition is determined to be satisfied when the distance on the travel road between the first junction and the second junction is equal to or shorter than the determination threshold. When the distance on the travel road between the first junction and the second junction is not equal to or shorter than the determination threshold, on the other hand, the concurrent destination presentation condition is determined not to be satisfied. Further, as described above, the concurrent destination presentation condition may be set in accordance with the vehicle speed of the vehicle, the possibility of a lane change by the vehicle, the existence of a curve ahead of the junctions, and so on.

When it is determined in S14 that the junctions do not exist consecutively, or when it is determined in S16 that the junctions do not satisfy the concurrent destination presentation condition, the destination information ahead of the nearest junction to the vehicle is obtained (S18). This acquisition processing is processing for acquiring destination information such as place name data relating to the travel roads branching off from the junction, and is performed by the destination information extraction unit 24. When the travel road branches in two travel roads from the junction, for example, destination information indicating respective destinations of the two travel roads that branch off from the junction is obtained. Place name data, locality name data, or landmark name data indicating the destinations ahead of the junction are obtained as the destination information.

The processing then advances to S20, where destination information presentation processing is performed. The destination information presentation processing is processing for presenting the destination information to the driver of the vehicle, and is performed by the destination information presentation unit 25. For example, the destination information obtained in S18 is output to the HMI unit 13. More specifically, destination candidate place names are displayed by the HMI unit 13 or output by the HMI unit 13 as voice output.

The processing then advances to S22, where destination setting processing is performed. The destination setting processing is processing for setting a destination candidate selected by the driver of the vehicle as the destination of the vehicle, and is performed by the destination setting unit 26, for example. More specifically, a destination candidate selected by the driver from the destination candidates presented by the HMI unit 13 is set as the destination of the vehicle. The driver can select a destination candidate by performing an input operation on a touch panel monitor, a switch, or a button, or by performing a voice input operation or another selection operation.

Meanwhile, when it is determined in S16 that the junctions satisfy the concurrent destination presentation condition, the destination information ahead of the consecutive junctions is obtained (S24). In other words, both the destination information ahead of the junction nearest the vehicle and the destination information ahead of the following junction are obtained. This acquisition processing is processing for acquiring the destination information such as place name data ahead of the consecutive junctions existing on the travel road, and is performed by the destination information extraction unit 24, for example. When, as shown in FIG. 3, for example, the travel road branches in a first travel road and a second travel road from the first junction 91 constituting the nearest junction, and the second travel road branches further into a third travel road and a fourth travel road from the second junction 92, destination information indicating respective destinations corresponding to the first travel road, the third travel road, and the fourth travel road are obtained. In FIG. 3, destination information indicating respective destinations corresponding to three travel roads, namely the A direction, the B direction, and the C direction, is obtained.

The processing then advances to S26 in FIG. 2, where the destination information presentation processing is performed. The destination information presentation processing is processing for presenting the destination information ahead of the junctions to the driver of the vehicle, and is performed by the destination information presentation unit 25, for example. More specifically, the place name data and so on serving as the destination information obtained in S24 are output to the HMI unit 13. When, for example, two junctions appear consecutively such that destinations exist in three directions, place names or the like respectively indicating the destinations of the three directions are either displayed concurrently by the HMI unit 13 as destination candidates or output by the HMI unit 13 consecutively as voice output. In this case, a plurality of destination candidates may be presented in relation to a single direction.

The processing then advances to S28, where the destination setting processing is performed. The destination setting processing is processing for setting the destination candidate selected by the driver of the vehicle as the destination of the vehicle, and is performed by the destination setting unit 26, for example. More specifically, the destination candidate selected by the driver from the destination candidates presented by the HMI unit 13 is set as the destination of the vehicle. At this time, the driver can set the destinations of a plurality of junctions in a single destination candidate selection operation by selecting the destination candidates ahead of the consecutive junctions.

When the processing of S22 and S28 is complete, the driving assistance execution processing is performed (S30). As described above, the driving assistance execution processing is processing for executing driving assistance to cause the vehicle to travel along the travel road. When the destination is set in S22 or S28, a travel road heading toward the determined destination is set as a route, and the vehicle is caused to travel along the route. More specifically, a control signal is output from the driving assistance control unit 27 to the driving assistance execution unit 3, whereby the driving assistance execution unit 3 implements travel control on the vehicle by performing assistance operations such as a steering operation and a driving/braking operation, for example. When the processing of S30 is complete, the series of control processes is terminated. Note that in the series of control processes shown in FIG. 2, a part of the control processes may be omitted, the control processes may be performed in a different order, and other control processes may be added, as long as a result of the control is not modified thereby.

With the driving assistance apparatus 1 according to this embodiment, as described above, when driving assistance is provided to cause the vehicle to travel along the travel road and a plurality of junctions exist on the travel road consecutively such that the concurrent destination presentation condition is satisfied, the destination information ahead of the plurality of junctions is presented to the driver so that the driver can select the destination of the vehicle. The destinations of a plurality of junctions can therefore be set by a single destination selection operation. Hence, even when a plurality of junctions exist consecutively, the driver can select the destinations ahead of the junctions smoothly, and as a result, appropriate driving assistance can be provided.

When, as shown in FIG. 3, for example, driving assistance is provided to cause the vehicle M to travel along the travel road 90 and the first junction 91 exists in the advancement direction of the vehicle M, the driver is prompted to select a destination candidate ahead of the first junction 91, whereupon the vehicle M is controlled to travel toward the selected destination. When, at this time, the distance L between the first junction 91 constituting the nearest junction and the second junction 92 constituting the following junction is shorter than the predetermined distance, the destination ahead of the second junction 92 must be selected immediately after selecting and setting the destination ahead of the first junction 91, and therefore, depending on the distance L, the driver may not be able to select the destination ahead of the second junction 92 in good time after selecting and setting the destination ahead of the first junction 91. With the driving assistance apparatus 1 according to this embodiment, on the other hand, when the distance between the first junction 91 constituting the nearest junction and the second junction 92 constituting the following junction is shorter than the predetermined distance such that the concurrent destination presentation condition is satisfied, destination candidates ahead of the plurality of junctions 91, 92 are presented to the driver so that the driver can make a selection therefrom. In other words, destination candidates corresponding to the A direction, the B direction, and the C direction are presented concurrently so that the driver can select the destinations ahead of the plurality of junctions 91, 92 in a single operation. A number of destination selection operations can therefore be reduced, enabling the driver to select the destinations ahead of the junctions smoothly, and as a result, appropriate driving assistance can be provided.

Further, in the driving assistance apparatus 1 according to this embodiment, the concurrent destination presentation condition is set to be satisfied when the distance on the travel road between the first junction and the second junction is equal to or shorter than the distance determination threshold. Therefore, when a plurality of junctions exist on the travel road and the distance between the junctions is equal to or shorter than the distance determination threshold, the destination information ahead of the plurality of junctions is presented to the driver so that the driver can select the destination of the vehicle. The destinations of a plurality of junctions can therefore be set in a single destination selection operation so that even when a plurality of junctions exist consecutively within a short distance, the driver can select the destinations ahead of the junctions smoothly. As a result, appropriate driving assistance can be provided.

Furthermore, in the driving assistance apparatus 1 according to this embodiment, by determining whether or not the concurrent destination presentation condition is satisfied after setting the determination threshold to be steadily longer as the vehicle speed of the vehicle increases, the concurrent destination presentation condition becomes steadily more likely to be satisfied as the vehicle speed increases, and therefore sufficient time for the driver to select a destination can be secured even when the vehicle speed is high. As a result, the driver can select the destinations ahead of the junctions smoothly.

Moreover, in the driving assistance apparatus 1 according to this embodiment, by determining whether or not the concurrent destination presentation condition is satisfied after setting the determination threshold to be longer when the possibility of a lane change by the vehicle before reaching the second junction exists than when the possibility of a lane change does not exist, the concurrent destination presentation condition is more likely to be satisfied when the possibility of a lane change exists, and therefore sufficient time for the driver to select a destination can be secured even when the possibility of a lane change exists. As a result, the driver can select the destinations ahead of the junctions smoothly.

Further, in the driving assistance apparatus 1 according to this embodiment, by determining whether or not the concurrent destination presentation condition is satisfied after setting the determination threshold to be longer when a curve having one of a curvature equal to or larger than a predetermined curvature and a radius of curvature equal to or smaller than a predetermined radius of curvature exists in the predetermined region following the second junction than when such a curve does not exist, the concurrent destination presentation condition is more likely to be satisfied when a curve exists ahead of the second junction, and therefore the destination can be set early even when a curve exists ahead of the second junction, whereupon the vehicle can be caused to travel in preparation for the curve. As a result, appropriate driving assistance can be provided.

Note that the embodiment described above illustrates one embodiment of the driving assistance apparatus according to the invention, and the driving assistance apparatus according to the invention is not limited to the above embodiment. The driving assistance apparatus according to the above embodiment may be modified or implemented in another application as long as the scope of the claims is not modified.

For example, a case in which driving assistance is provided to a vehicle capable of autonomous travel was described in the above embodiment, but driving assistance may be provided to a vehicle that is not capable of autonomous travel. In other words, when consecutive junctions located ahead in the advancement direction satisfy the concurrent destination presentation condition while the driver drives the vehicle manually, the destination information may be presented concurrently. In this case, control for indicating advancement directions at the junctions in order to guide the vehicle along a route to the set destination may be performed in place of travel control by the driving assistance control unit 27 of FIG. 1 and during the driving assistance execution processing of S30 in FIG. 2.

Further, a case in which the destination information ahead of two junctions are presented concurrently when the junctions satisfy the concurrent destination presentation condition was described in the above embodiment, but the invention may be applied to three or more junctions. In other words, the destination information ahead of three or more junctions may be presented concurrently when the junctions satisfy the concurrent destination presentation condition. For example, when three or more junctions exist consecutively and a distance range of the junctions is within the determination threshold, the destination information ahead of the junctions may be presented to the driver concurrently. Likewise in this case, the driver can select the destinations ahead of the junctions smoothly, and as a result, appropriate driving assistance can be provided.

What is claimed is:

1. A driving assistance apparatus that provides driving assistance to cause a vehicle to travel along a travel road, the driving assistance apparatus comprising:
    an electronic control unit; and
    a driving assistance execution unit connected to the electronic control unit,
    wherein the electronic control unit is configured to:
        when a first junction and a second junction located ahead of the first junction exist on the travel road in an advancement direction of the vehicle, so that the first junction is closer to the vehicle than the second junction, determine whether or not the first junction and the second junction satisfy a concurrent destination presentation condition on the basis of a distance on the travel road between the first junction and the second junction;
        when the first junction and the second junction are determined to satisfy the concurrent destination presentation condition, present destination information indicating at least one destination between the first junction and the second junction, and destination information indicating at least one destination ahead of the second function to a driver of the vehicle; and
        when the first junction and the second junction are determined not to satisfy the concurrent destination presentation condition, the electronic control unit is configured to present the destination information between the first junction and the second junction and not to present the destination information ahead of the second junction; and
    a setting unit configured to set a destination to which the vehicle travels according to a destination selected by the driver on the basis of the destination information presented to the driver, and
    the driving assistance execution unit is configured to control the vehicle to travel along the travel road in accordance with the destination selected by the driver on the basis of the destination information presented to the driver by the electronic control unit,
    wherein the electronic control unit is configured to determine that the concurrent destination presentation condition is satisfied when the distance on the travel road between the first junction and the second junction is equal to or shorter than a determination threshold,
    wherein the electronic control unit is configured to set the determination threshold to be higher when a curve of the travel road having one of a curvature equal to or larger than a predetermined curvature and a radius of curvature equal to or smaller than a predetermined radius of curvature exists within a predetermined region ahead of the second junction than when the curve does not exist.

2. A driving assistance apparatus that provides driving assistance to cause a vehicle to travel along a travel road, the driving assistance apparatus comprising:
    an electronic control unit; and
    a driving assistance execution unit connected to the electronic control unit,
    wherein the electronic control unit is configured to:
        when a first junction and a second junction located ahead of the first junction exist on the travel road in an advancement direction of the vehicle, so that the first junction is closer to the vehicle than the second junction, determine whether or not the first junction and the second junction satisfy a concurrent destination presentation condition on the basis of a distance on the travel road between the first junction and the second junction;
        when the first junction and the second junction are determined to satisfy the concurrent destination presentation condition, present destination information between the first junction and the second junction and destination information ahead of the second junction to a driver of the vehicle; and
        when the first junction and the second junction are determined not to satisfy the concurrent destination presentation condition, the electronic control unit is configured to present the destination information between the first junction and the second junction and not to present the destination information ahead of the second junction, and
    the driving assistance execution unit is configured to control the vehicle to travel along the travel road in accordance with a destination selected by the driver on the basis of the destination information presented to the driver by the electronic control unit,
    wherein the electronic control unit is configured to determine that the concurrent destination presentation condition is satisfied when the distance on the travel road between the first junction and the second junction is equal to or shorter than a determination threshold,
    wherein the electronic control unit is configured to set the determination threshold to be higher when a possibility of a lane change of the travel road by the vehicle between the first junction and the second junction exists than when the possibility of the lane change does not exist.

* * * * *